United States Patent
Han et al.

(10) Patent No.: US 7,953,045 B2
(45) Date of Patent: May 31, 2011

(54) MOBILE TERMINAL AND CONTROLLING METHOD THEREOF

(75) Inventors: Youn-hee Han, Gyeonggi-do (KR); Jung-ho Kim, Gyeonggi-do (KR); Xiaoyu Liu, Gyeonggi-do (KR); Jung-hoon Cheon, Gyeonggi-do (KR); Hee-jin Jang, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1038 days.

(21) Appl. No.: 11/225,002

(22) Filed: Sep. 14, 2005

(65) Prior Publication Data

US 2006/0056311 A1     Mar. 16, 2006

(30) Foreign Application Priority Data

Sep. 14, 2004   (KR) .......................... 10-2004-0073566

(51) Int. Cl.
*H04W 4/00*     (2009.01)
*H04W 36/00*    (2009.01)

(52) U.S. Cl. ........................................ 370/332; 455/437

(58) Field of Classification Search .................. 370/331, 370/332, 338, 236, 395.5, 351; 455/436, 455/442, 437, 444, 574, 418; 709/203, 223
See application file for complete search history.

(56) References Cited

U.S. PATENT DOCUMENTS

| | | | |
|---|---|---|---|
| 6,826,154 B2* | 11/2004 | Subbiah et al. | 370/236 |
| 2003/0095523 A1* | 5/2003 | Korus et al. | 370/338 |
| 2004/0077341 A1* | 4/2004 | Chandranmenon et al. | 455/418 |
| 2004/0137901 A1* | 7/2004 | Hamasaki et al. | 455/436 |
| 2004/0258074 A1* | 12/2004 | Williams et al. | 370/395.5 |
| 2005/0080884 A1* | 4/2005 | Siorpaes et al. | 709/223 |
| 2005/0089015 A1* | 4/2005 | Tsuge et al. | 370/351 |
| 2005/0176473 A1* | 8/2005 | Melpignano | 455/574 |
| 2006/0129630 A1* | 6/2006 | Catalina-Gallego et al. | 709/203 |
| 2006/0199588 A1* | 9/2006 | Gao et al. | 455/442 |

* cited by examiner

*Primary Examiner* — Aung S Moe
*Assistant Examiner* — Awet Haile
(74) *Attorney, Agent, or Firm* — Staas & Halsey LLP

(57) ABSTRACT

A control method for a mobile terminal which connects to a router linked to an external network through at least one interface, including receiving a router advertisement message from the router through a first interface, determining whether prefix information of the received router advertisement message is identical with prefix information of a preset internet protocol (IP) configuration reuse group including the first interface, and generating an IP configuration of the first interface when the two prefix information are identical. Accordingly, at the time of a vertical handover, continuity of the A/V session can be maintained without having to use mobile IP technology.

11 Claims, 5 Drawing Sheets

MOBILE TERMINAL AND CONTROLLING METHOD THEREOF

CROSS-REFERENCE TO RELATED APPLICATIONS

This application claims the benefit under 35 U.S.C. §119 (a) from Korean Patent Application No. 2004-73566, filed on Sep. 14, 2004 in the Korean Intellectual Property Office, the entire disclosure of which is incorporated herein by reference.

BACKGROUND OF THE INVENTION

1. Field of the Invention

Embodiments of the present invention relate generally to a mobile terminal and controlling method for the mobile terminal. More specifically, embodiments of the present invention relate to a mobile terminal and control method for the mobile terminal for maintaining an A/V session when a handover occurs between heterogeneous networks.

2. Description of the Related Art

The number of wireless Internet users is increasing with the rapid prevalence of the Internet, the development of wireless communication technology, and the improved performance of mobile terminals such as a portable computers and personal digital assistants (PDAs). The Internet environment further enables mobile terminals to occasionally move around and change their network access points.

To support the Internet communication of the mobile terminal, high quality Internet service should be ensured for a subsequent network environment as well as the current network environment, even when the mobile terminal moves from the current network area to the subsequent network area. That is, the mobile terminal needs to seamlessly communicate during the move, for which handovers have been introduced. Handovers can be divided into horizontal handovers and vertical handovers (VHO). The VHO is a handover performed between heterogeneous networks.

The development of the Internet has further led to the generalization of real-time multimedia services including video on demand (VOD), audio on demand (AOD), picture phone and video chatting. Especially, considering that the development of the wireless Internet and the enhanced data processing of terminals has enabled real-time multimedia services for mobile terminals and has accelerated the market extension relating to such services. Accordingly, users may be provided with various real-time multimedia services through mobile terminals while moving from place to place.

In the related art, when mobile terminals change their locations while maintaining multimedia services, a Session Initiation Protocol (SIP) capable of supporting mobile Internet protocol (IP) or mobility is required to maintain continuity of an A/V session. The mobile IP is for a mobile terminal using an IP. When the mobile terminal accesses a remote network from outside of a home network, and registers an address acquired at a current network in a home agent, the home network forwards data to the mobile terminal connected to the remote network. The use of the mobile IP requires the installation of the home agent and loading of a mobile IP protocol stack. Thus, manufacturing costs of the mobile terminals increase, with the current solutions requiring a long time to process the mobile IP.

SUMMARY OF THE INVENTION

Embodiments of the present invention have been developed in order to solve the above and/or other problems associated with the conventional arrangement. An aspect of embodiments of the present invention provide a mobile terminal and control method for the mobile terminal for maintaining continuity of an A/V session without a mobile IP by sharing an IP configuration between interfaces included in preset IP configuration reuse groups at the time of a vertical handover.

To achieve the above and/or other aspects and advantages, embodiments of the present invention include a control method for a mobile terminal which connects to a router through at least one interface, the method including receiving a router advertisement message from the router through a first interface, determining whether prefix information of the received router advertisement message is identical with prefix information of a preset internet protocol (IP) configuration reuse group including the first interface, and generating an IP configuration of the first interface when the prefix information of the preset IP configuration reuse group is identical to the prefix information of the received router advertisement message.

The method may further include deferring the generation of the IP configuration of the first interface when the prefix information of the preset IP configuration reuse group is not identical to the prefix information of the received router advertisement message.

In the generating of the IP configuration of the first interface, when a priority is set to interfaces of the preset IP configuration reuse group, previously selected for the IP configuration reuse group, the generating of the IP configuration of the first interface may further include determining whether the first interface corresponds to a highest priority interface in the preset IP configuration reuse group when the prefix information of the preset IP configuration reuse group is not identical to the received router advertisement message, and generating the IP configuration of the first interface corresponding to a stored configuration profile for the first interface, when the first interface corresponds to the highest priority interface.

The method may further include deferring the generating of the IP configuration of the first interface when the first interface does not correspond to the highest priority interface.

To achieve the above and/or other aspects and advantages, embodiments of the present invention include a control method for a mobile terminal ending communication with a router, through a first interface, and initiating communication with the router through a second interface, including determining whether the first interface belongs to a preset internet protocol (IP) configuration reuse group, and storing an IP configuration used at the first interface when the first interface belongs to the preset IP configuration reuse group.

The method may further include determining whether the second interface belongs to the IP configuration reuse group, and applying the stored IP configuration to the second interface when the second interface belongs to the IP configuration reuse group. The method may still further include multicasting one of a gratuitous address resolution protocol (ARP) and a neighbor advertisement to the router, from the mobile terminal, to update binding information of an IP address and a media access control (MAC) address with respect to the second interface at the router.

To achieve the above and/or other aspects and advantages, embodiments of the present invention include at least one medium including computer readable code to implement embodiments of the present invention.

To achieve the above and/or other aspects and advantages, embodiments of the present invention include a mobile terminal to connect to a router through at least one interface, the mobile terminal including a network layer to provide a prefix information contained in a router advertisement message received from the router through a first interface, and an IP configuration reuse manager layer to determine whether the prefix information of the received router advertisement message is identical with prefix information of a preset internet protocol (IP) configuration reuse group including the first interface, and to store a configuration profile, wherein the network layer generates an IP configuration of the first interface when the prefix information of the preset IP configuration reuse group is identical to the prefix information of the received router advertisement message.

The network layer may defer the generation of the IP configuration of the first interface when the prefix information of the preset IP configuration reuse group is not identical to the received router advertisement message.

In addition, in the generating of the IP configuration of the first interface, when a priority is set to interfaces of the preset IP configuration reuse group, previously selected for the IP configuration reuse group, the network layer may further generate the IP configuration of the first interface by the IP configuration reuse manager layer determining whether the first interface corresponds to a highest priority interface in the preset IP configuration reuse group when the prefix information of the preset IP configuration reuse group is not identical to the received router advertisement message, and the network layer generating the IP configuration of the first interface corresponding to the stored configuration profile for the first interface, when the first interface corresponds to the highest priority interface.

The network layer may also defer the generating of the IP configuration of the first interface when the first interface does not correspond to the highest priority interface, as determined by the IP configuration reuse manager layer.

To achieve the above and/or other aspects and advantages, embodiments of the present invention include a mobile terminal system, the system including a router, and a mobile terminal ending communication with the router, through a first interface, and initiating communication to the router through a second interface, wherein the mobile terminal includes an IP configuration reuse manager layer to determine whether the first interface belongs to a preset internet protocol (IP) configuration reuse group, and to store an IP configuration used at the first interface when the first interface belongs to the preset IP configuration reuse group.

The IP configuration reuse manager layer may determine whether the second interface belongs to the IP configuration reuse group, and the mobile terminal may further include a network layer to apply the stored IP configuration to the second interface when the second interface belongs to the IP configuration reuse group.

The IP configuration reuse manager layer may further multicasts one of a gratuitous address resolution protocol (ARP) and a neighbor advertisement to the router, from the mobile terminal, to update binding information of an IP address and a media access control (MAC) address with respect to the second interface at the router.

To achieve the above and/or other aspects and advantages, embodiments of the present invention include a mobile terminal to connect to a router through at least one interface, the mobile terminal including a network layer to provide a prefix information contained in a router advertisement message received from the router through a first interface, and an IP configuration reuse manager means for determining whether the prefix information of the received router advertisement message is identical with prefix information of a preset internet protocol (IP) configuration reuse group including the first interface, wherein the network layer generates an IP configuration of the first interface based on a determination by the IP configuration reuse manager means.

To achieve the above and/or other aspects and advantages, embodiments of the present invention include a mobile terminal system, the system including a router, and a mobile terminal ending communication with the router, through a first interface, and initiating communication to the router through a second interface, wherein the mobile terminal includes an IP configuration reuse manager means for determining whether the first interface belongs to a preset internet protocol (IP) configuration reuse group and to store an IP configuration, wherein the mobile terminal generates an IP configuration of the first interface based on a determination by the IP configuration reuse manager means.

Accordingly, at the time of the vertical handover, the continuity of the A/V session can be maintained without having to use the mobile IP technology.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of embodiments, taken in conjunction with the accompanying drawings, of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below in order to explain the present invention by referring to the drawings.

Figure 1:
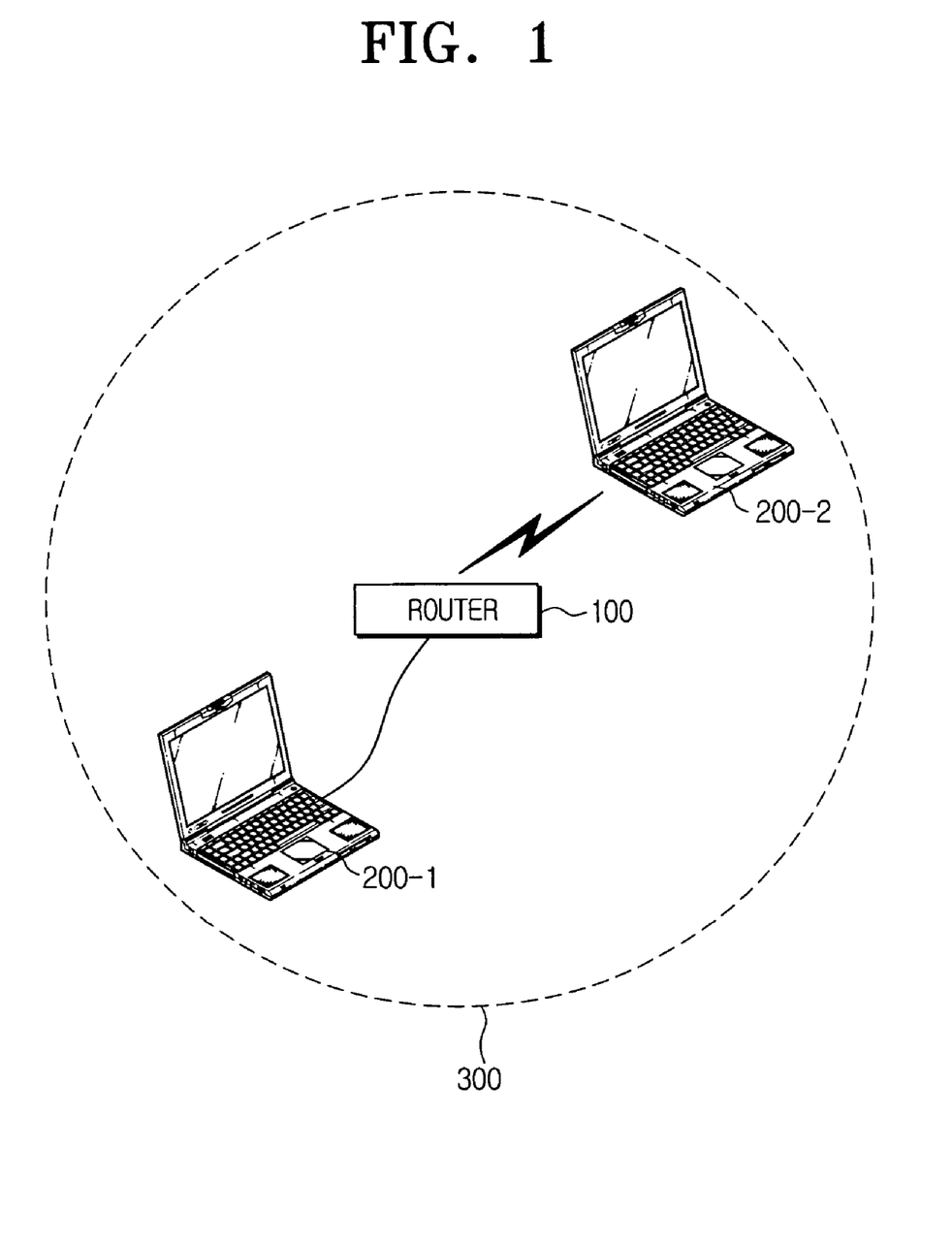
FIG. 1 illustrates a handover occurrence between heterogeneous networks, according to an embodiment of the present invention.

FIG. 1 illustrates a handover taking place between heterogeneous networks, according to an embodiment of the present invention. An understanding of the present invention will be facilitated by exemplifying notebook computers 200-1 and 200-2, as mobile terminals.

As illustrated, the heterogeneous networks are an Ethernet and a wireless local area network (WLAN). The first mobile terminal 200-1 can be connected to a router 100 over the Ethernet. The second mobile terminal 200-2 can be initially connected to and then disconnected from the Ethernet, and then connected to the router 100 via the WLAN, for example.

A precondition to realize embodiments of the present invention is the use of a tight-coupled vertical handover environment 300. The tight-coupled vertical handover environment 300 can use the same network prefix. Typically, as home and office network environments share the same network prefix, embodiments of the present invention may be applied to most network environments.

The router 100 can maintain binding information relating to interfaces in the mobile terminals, according to a corresponding network. The binding information contains an IP address and a media access control (MAC) address. As opposed to the conventional mobile terminal having a separate IP address for each interface, according to the network, in embodiments of the present invention the IP address can be shared based on a user's selection with respect to the interfaces.

When the first mobile terminal 200-1 accesses the router 100 over the Ethernet, an interface for Ethernet within the first mobile terminal 200-1 is used. The interface for Ethernet is assigned with the IP address of the first mobile terminal 200-1.

When the second mobile terminal 200-2 changes its location, e.g., from accessing the router 100 over the Ethernet, and wants to operate in a wireless network environment, the second mobile terminal 200-2 needs to access an external network over the WLAN. In this situation, the second mobile terminal 200-2 uses an interface for WLAN. In the related art, the interface for WLAN is assigned with an ID address different from an IP address of the interface for Ethernet, and thus the respective interfaces have different IP addresses.

According to an embodiment of the present invention, a priority can be set to each of the interfaces. For example, if the Ethernet interface has the highest priority, and the WLAN interface has a lower priority than the Ethernet, an IP address of the interface for Ethernet can also be applied to the interface for WLAN. Hence, the IP address set to the previous interface, before the handover, can be applied to the interface after the handover. Accordingly, identifiers of the first and second mobile terminals 200-1 and 200-2 can be maintained.

Figure 2A:
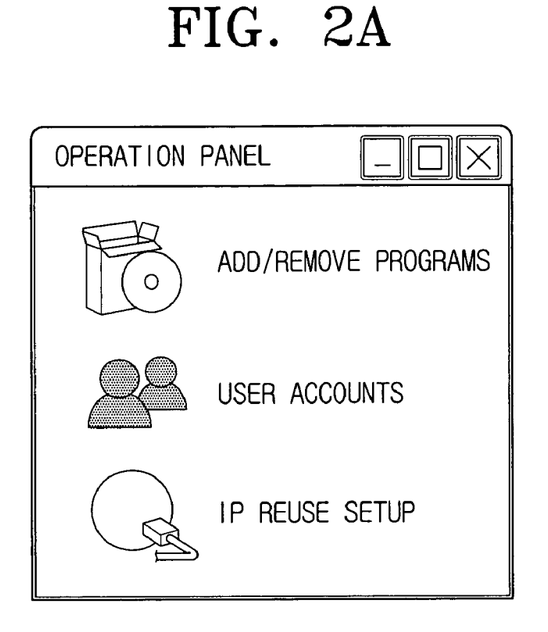
FIGS. 2A through 2C illustrate graphic user interfaces (GUIs), according to embodiments of the present invention.
Figure 2B:
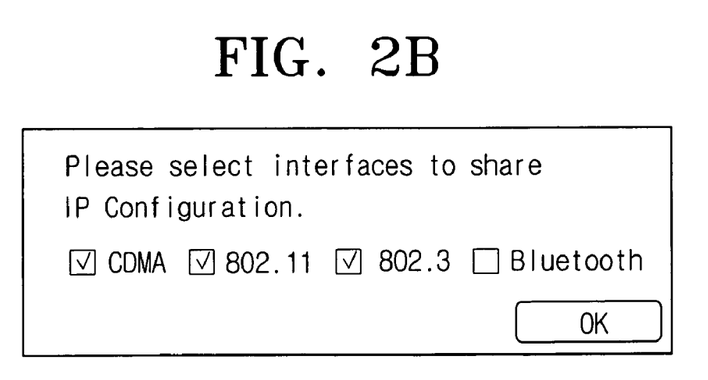
Figure 2C:
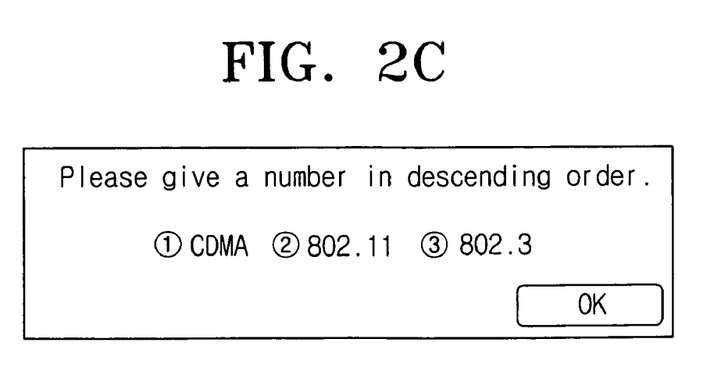

FIGS. 2A through 2C illustrate graphic user interfaces (GUIs), according to embodiments of the present invention.

Referring to FIGS. 1 and 2, as an example, when a user enters an IP configuration reuse setup GUI display command, through an input device of the first mobile terminal 200-1, before the handover, the GUI of FIG. 2A is displayed. The user can select an 'IP reuse setup' and initiate a preset operation for the IP configuration reuse.

When the user selects the 'IP reuse setup', the GUI of FIG. 2B may be displayed to the user. Next, the user can select an interface to share the IP configuration. As illustrated in the example of FIG. 2B, the first and second mobile terminals 200-1 and 200-2 support interfaces of CDMA, 802.11, 802.3 and Bluetooth, for example, noting that alternative interfaces are also available. The user may select from the CDMA, 802.11 and 802.3 interfaces to share the IP configuration, as shown in FIG. 2B.

After selecting the interfaces, the user may confirm the selection by pressing the 'OK' button, which may result in the GUI of FIG. 2C being displayed to the user. The user may specify the priority of the interfaces to share the IP configuration, that is, the user may give priority to any of CDMA, 802.11 and 802.3, in a particular order, as shown in FIG. 2C. As illustrated in this example, CDMA has the highest priority, such that the IP configuration used to connect to the external network through CDMA is reused to connect to the external network using 802.11 or 802.3.

Information relating to the selected interfaces of FIG. 2B and the specified priority of FIG. 2C can be provided to an IP configuration reuse manager (ICRM) layer 420 (shown in FIG. 3) and stored as a configuration profile.

Figure 3:
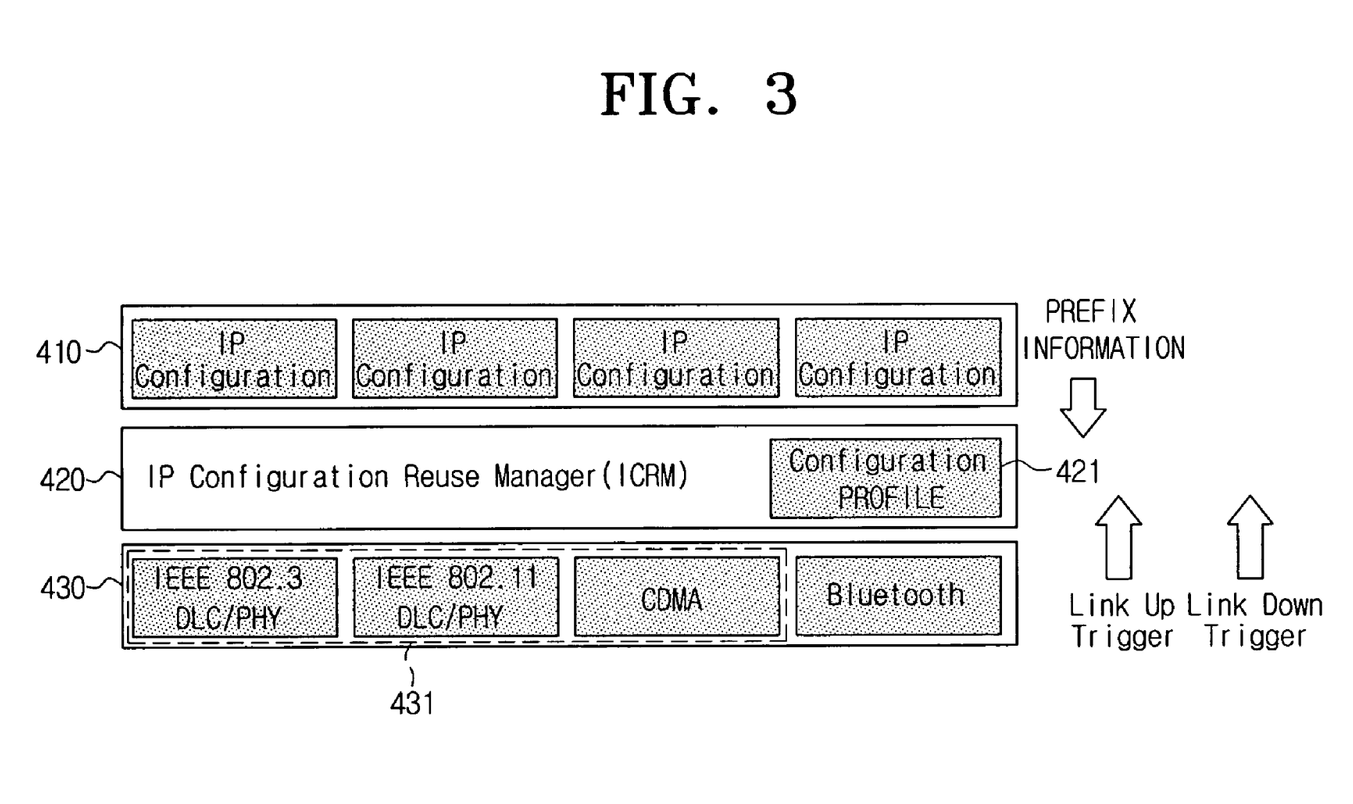
FIG. 3 illustrates an architecture for a mobile terminal, according to an embodiment of the present invention.

FIG. 3 illustrates an architecture for the first and second mobile terminals 200-1 and 200-2, according to an embodiment of the present invention, which is explained in reference to FIGS. 1 through 3.

As shown in FIG. 3, the ICRM layer 420 is between a network layer 410 and a DLC/PHY layer 430.

When a router advertisement (RA) message is received from the router 100, the network layer 410 provides prefix information contained in the RA message to the ICRM layer 420. If a highest priority ACK message is received, the network layer 410 generates an IP configuration with respect to the current interface used to receive the RA message. If an IP configuration pending message is received, the network layer 410 defers generating the IP configuration for the current interface.

When previous interface is disconnected, e.g., from the router 100, the DLC/PHY layer 430 sends LINK_DOWN_TRIGGER to the ICRM layer 420. If a new link is set during the disconnection between the router 100 and the current interface, that is, if the mobile terminal is connected to the router 100 across a new interface, i.e., a current interface, the DLC/PHY layer 430 sends LINK_UP_TRIGGER to the ICRM layer 420.

The ICRM layer 420 is provided with the prefix information from the network layer 410. The ICRM layer 420 determines whether the current interface used to connect to the router 100 belongs to an IP configuration reuse group 431. To this end, the ICRM layer 420 uses the stored configuration profile 421. The ICRM layer 420 determines whether the prefix information from the network layer 410 is the same as the prefix information set at the IP configuration reuse group 431, by use of the stored configuration profile 421.

The ICRM layer 420 can determine whether the current interface for connecting to the router 100 has the highest priority in the IP configuration reuse group 431 by use of the stored configuration profile 421.

When the current interface has the highest priority, the ICRM layer 420 sends the highest priority ACK message to the network layer 410. When the current interface does not have the highest priority, the ICRM layer 420 sends the IP configuration pending message to the network layer 410.

Figure 4:
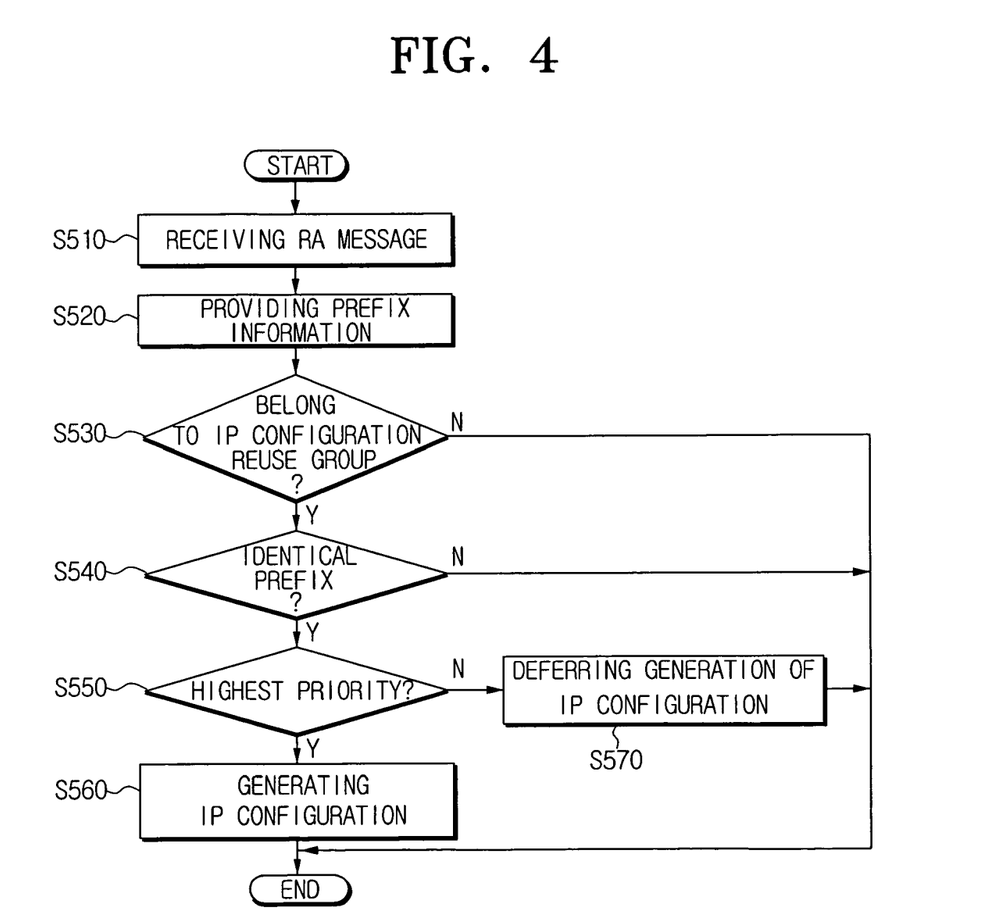
FIG. 4 is a flowchart illustrating an IP configuration being generated according to an embodiment of the present invention.

FIG. 4 is a flowchart illustrating an IP configuration being generated, according to an embodiment of the present invention.

Referring to FIGS. 1 through 4, the network layer 410 of the first mobile terminal 200-1 can receive an RA message from the router 100 (S510). As explained above, the RA message can contain the prefix information of a currently connected network.

The network layer 410 provides the prefix information to the ICRM layer 420 (S520).

When the prefix information is provided from the ICRM layer 420, it is determined whether the current interface belongs to the IP configuration reuse group 431(S530).

If so, the ICRM layer 420 determines whether the prefix information from the network layer 410 is identical with the prefix information set to the IP configuration reuse group 431 (S540).

If so, it is determined whether the current interface has the highest priority (S550).

When the current interface has the highest priority (S550), the IP configuration is generated (S560).

When the current interface does not have the highest priority (S550), the generation of the IP configuration is deferred (S570).

Figure 5:
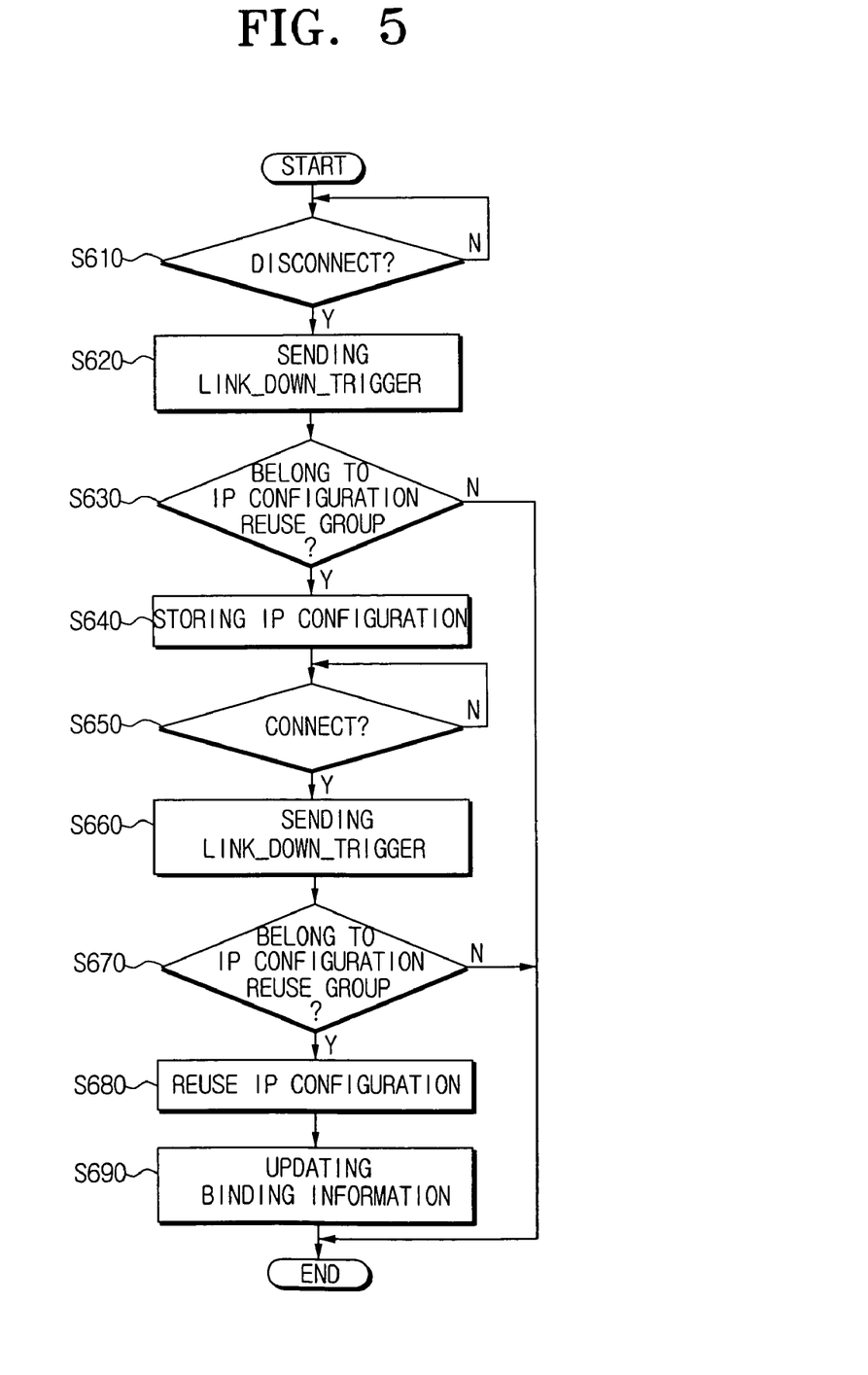
FIG. 5 is a flowchart illustrating the IP configuration being reused according to an embodiment of the present invention.

FIG. 5 is a flowchart illustrating how an IP configuration is reused, according to an embodiment of the present invention.

Referring to FIGS. 1 through 3 and 5, when the first mobile terminal 200-1 is disconnected from an interface with the router 100 via one of the interfaces (S610), the DLC/PHY layer 430 sends LINK_DOWN_TRIGGER to the ICRM layer 420 (S620).

The ICRM layer 420 determines whether the disconnected interface belongs to the IP configuration reuse group 431 (S630).

If so, the IP configuration applied to the disconnected interface is stored (S640).

When a new link is connected (S650), the DLC/PHY layer 430 sends LINK_UP_TRIGGER to the ICRM layer 420 (S660).

The ICRM layer 420 determines whether the interface used for the new link belongs to the IP configuration reuse group 431(S670).

If so, the stored IP configuration is reused as the IP configuration for the new interface (S680).

The ICRM layer 420 updates the binding information of the IP address and the MAC address with respect to the new interface at the router 100 by multicasting a gratuitous address resolution protocol (ARP) and a neighbor advertisement (S690). The update of the binding information is required as the MAC address assigned to an interface is determined when the product is forwarded to the market.

In light of the foregoing as mentioned above, it is possible to perform a handover of a mobile terminal with continuity of maintenance of an A/V session without mobile IP technology. Accordingly, additional network equipment is not needed, as required when using the mobile IP technology, thereby reducing manufacturing costs.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium, e.g., in the mobile device, in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The media may also be a distributed network, so that the computer readable code is stored and executed in a distributed fashion.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A control method for a mobile terminal which connects to a router through at least one interface, the method comprising:
   receiving a router advertisement message from the router through a first interface;
   determining whether prefix information of the received router advertisement message is identical with prefix information of a preset internet protocol (IP) configuration reuse group including the first interface and one or more other interfaces, wherein each of the interfaces has been selected by a user to share an IP address set for one of the interfaces at a time of a vertical handover performed between heterogeneous networks among interfaces having the same prefix, and thus an identifier of the mobile terminal is maintained at the time of the vertical handover;
   determining whether the first interface corresponds to a highest priority interface in the preset IP configuration reuse group when the prefix information of the reset IP configuration reuse group is identical to the prefix information of the received router advertisement message; and
   generating a IP configuration of the first interface when the prefix information of the preset IP configuration reuse group is identical to the prefix information of the received router advertisement message and when the first interface corresponds to the highest priority interface and otherwise deferring the generating of the IP configuration of the first interface when the first interface does not correspond to the highest priority interface.

2. The control method of claim 1, further comprising deferring the generation of the IP configuration of the first interface when the prefix information of the preset IP configuration reuse group is not identical to the prefix information of the received router advertisement message.

3. At least one non transitory medium comprising computer readable code to implement the method of claim 1.

4. A control method for a mobile terminal ending communication with a router, through a first interface, and initiating communication with the router through a second interface, the method comprising:
   receiving a router advertisement message from the router through the first interface;
   determining whether prefix information of the received router advertisement message is identical to prefix information of a preset internet protocol (IP) configuration reuse group including the first interface and the second interface, wherein each of the interfaces has been selected by a user to share an IP address set for one of the interfaces at a time of a vertical handover performed between heterogeneous networks among interfaces having the same prefix;
   determining whether the first interface corresponds to a highest priority interface in the preset IP configuration reuse group when the prefix information of the preset IP configuration reuse group is identical to the prefix information of the received router advertisement message;
   generating an IP configuration of the first interface when the prefix information of the preset IP configuration reuse group is identical to the prefix information of the received router advertisement message and when the first interface corresponds to the highest priority interface and otherwise deferring the generating of the IP configuration of the first interface when the first interface does not correspond to the highest priority interface; and
   storing the IP configuration used at the first interface when the first interface belongs to the preset IP configuration reuse group and reusing the stored IP configuration when the communication is initiated with the router through the second interface.

5. The control method of claim 4, further comprising multicasting one of a gratuitous address resolution protocol (ARP) and a neighbor advertisement to the router, from the mobile terminal, to update binding information of an IP address and a media access control (MAC) address with respect to the second interface at the router.

6. At least one non transitory medium comprising computer readable code to implement the method of claim 4.

7. A mobile terminal to connect to a router through at least one interface, the mobile terminal comprising:
a network layer to provide a prefix information contained in a router advertisement message received from the router through a first interface; and
an IP configuration reuse manager layer to determine whether the prefix information of the received router advertisement message is identical with prefix information of a preset internet protocol (IP) configuration reuse group including the first interface and one or more other interfaces, wherein each of the interfaces has been selected by a user to share an IP address set for one of the interfaces at a time of a vertical handover performed between heterogeneous networks among interfaces having the same prefix, and to store a configuration profile, and thus an identifier of the mobile terminal is maintained at the time of the vertical handover,
the IP configuration reuse manager layer to determine whether the first interface corresponds to a highest priority interface in the preset IP configuration reuse group when the prefix information of the preset IP configuration reuse group is identical to the prefix information of the received router advertisement message,
wherein the network layer generates an IP configuration of the first interface when the prefix information of the preset IP configuration reuse group is identical to the prefix information of the received router advertisement message and when the first interface corresponds to the highest priority interface and otherwise the network layer defers generation of the IP configuration of the first interface when the first interface does not correspond to the highest priority interface.

8. The mobile terminal of claim 7, wherein the network layer defers the generation of the IP configuration of the first interface when the prefix information of the preset IP configuration reuse group is not identical to the received router advertisement message.

9. A mobile terminal system, the system comprising:
a router; and
a mobile terminal ending communication with the router, through a first interface, and initiating communication to the router through a second interface, wherein the mobile terminal comprises an IP configuration reuse manager layer to determine whether prefix information of an advertisement message received from the router is identical to prefix information of a preset internet protocol (IP) configuration reuse group including the first interface and the second interface wherein each of the interfaces has been selected by a user to share an IP address set for one of the interfaces at a time of a vertical handover performed between heterogeneous networks among interfaces having the same prefix, and to store an IP address used at the first interface when the first interface belongs to the preset IP configuration reuse group and reuse the stored IP address when the communication is initiated with the router through the second interface,
the IP configuration reuse manager layer to determine whether the first interface corresponds to a highest priority interface in the preset IP configuration reuse group when the prefix information of the preset IP configuration reuse group is identical to the prefix information of the received router advertisement message,
wherein an IP configuration of the first interface is generated when the prefix information of the preset IP configuration reuse group is identical to the prefix information of the received router advertisement message and when the first interface corresponds to the highest priority interface and otherwise deferring the generating of the IP configuration of the first interface when the first interface does not correspond to the highest priority interface, and
wherein the IP configuration reuse manager layer determines whether the second interface belongs to the IP configuration reuse group, and the mobile terminal further comprises a network layer to apply the stored IP address to the second interface when the second interface belongs to the IP configuration reuse group, and thus an identifier of the mobile terminal is maintained at the time of the vertical handover.

10. The system of claim 9, wherein the IP configuration reuse manager layer further multicasts one of a gratuitous address resolution protocol (ARP) and a neighbor advertisement to the router, from the mobile terminal, to update binding information of an IP address and a media access control (MAC) address with respect to the second interface at the router.

11. A mobile terminal to connect to a router through at least one interface, the mobile terminal comprising:
a network layer to provide a prefix information contained in a router advertisement message received from the router through a first interface; and
an IP configuration reuse manager to determine whether the prefix information of the received router advertisement message is identical with prefix information of a preset internet protocol (IP) configuration reuse group including the first interface and one or more other interfaces, wherein each of the interfaces has been selected by a user to share an IP address set for one of the interfaces at a time of a vertical handover performed between heterogeneous networks among interfaces having the same prefix, and thus an identifier of the mobile terminal is maintained at the time of the vertical handover,
wherein the network layer generates an IP address of the first interface when the prefix information of the preset IP configuration reuse group is identical to the prefix information of the received router advertisement message and when the first interface corresponds to the highest priority interface and otherwise the network layer defers generation of the IP address of the first interface when the first interface does not correspond to the highest priority interface.

* * * * *

UNITED STATES PATENT AND TRADEMARK OFFICE
CERTIFICATE OF CORRECTION

| | |
|---|---|
| PATENT NO. | : 7,953,045 B2 |
| APPLICATION NO. | : 11/225002 |
| DATED | : May 31, 2011 |
| INVENTOR(S) | : Youn-hee Han et al. |

It is certified that error appears in the above-identified patent and that said Letters Patent is hereby corrected as shown below:

Column 8, Line 6, In Claim 1, delete "reset" and insert -- preset --, therefor.

Column 9, Line 48, In Claim 9, delete "prefix" and insert -- a prefix --, therefor.

Signed and Sealed this
Fourteenth Day of February, 2012

David J. Kappos
*Director of the United States Patent and Trademark Office*